United States Patent [19]

Blackburn et al.

[11] 4,082,142

[45] Apr. 4, 1978

[54] HOUSING FOR EXPANSION UNIT OF COOLING SYSTEM

[75] Inventors: James R. Blackburn; Dudley C. Smith; Theo B. Smith, Jr., all of Dallas; Jerry N. Morgan, Mesquite, all of Tex.

[73] Assignee: John E. Mitchell Company, Dallas, Tex.

[21] Appl. No.: 726,250

[22] Filed: Sep. 24, 1976

[51] Int. Cl.² .............................................. F28F 7/00
[52] U.S. Cl. ...................................... 165/76; 62/302; 165/137
[58] Field of Search .......................... 98/114, 118, 119; 62/419, 429, 244, 298, 302; 165/122, 137, 76; 29/401 B; 219/366, 367, 368, 369, 370, 371

[56] References Cited

U.S. PATENT DOCUMENTS

| | | | |
|---|---|---|---|
| 3,230,733 | 1/1966 | Rutishauser et al. | 62/419 |
| 3,543,838 | 12/1970 | White | 62/223 |
| 3,874,191 | 4/1975 | Hudson | 62/419 |
| 3,907,050 | 9/1975 | Mullings | 98/114 |
| 3,977,467 | 8/1976 | Northrup | 165/76 |

*Primary Examiner*—William E. Wayner
*Assistant Examiner*—R. J. Charvat
*Attorney, Agent, or Firm*—Rogers, Eilers & Howell

[57] ABSTRACT

A housing, for the expansion unit of a cooling system, has a top wall, a bottom wall and end walls; and those walls define a space which accommodates that expansion unit. That housing has a front opening which is filled by an air-distributing transition member; and it has a rear opening that is substantially closed by an air-guiding member. That air-guiding member can support a motor and a pair of multi-vane blowers, or it can be an angular transition for a single blower. That air-guiding member is shorter than the rear opening to provide a short space which can accommodate the supply and return headers of the expansion unit. That air-guiding member can be set in either of two predetermined positions relative to that rear opening to permit the supply and return headers to be located at either end of the housing. Two sets of fastener-receiving openings are provided adjacent the rear opening in the housing; and a complementary set of fastener-receiving openings in the air-guiding member can be disposed in register with either of those sets of fastener-receiving openings. When the complementary set of fastener-receiving openings in the air-guiding member is disposed in register with either of the sets of fastener-receiving openings in the housing, that air-guiding member will block the other set of fastener-receiving openings. Supports are provided on the housing adjacent the upper and lower edges of the opening to hold the complementary set of fastener-receiving openings of the air-guiding member in position adjacent either of the two sets of fastener-receiving openings in the housing, so a workman can use both hands to set fasteners that will hold the air-guiding member in assembled relation with the housing.

28 Claims, 18 Drawing Figures

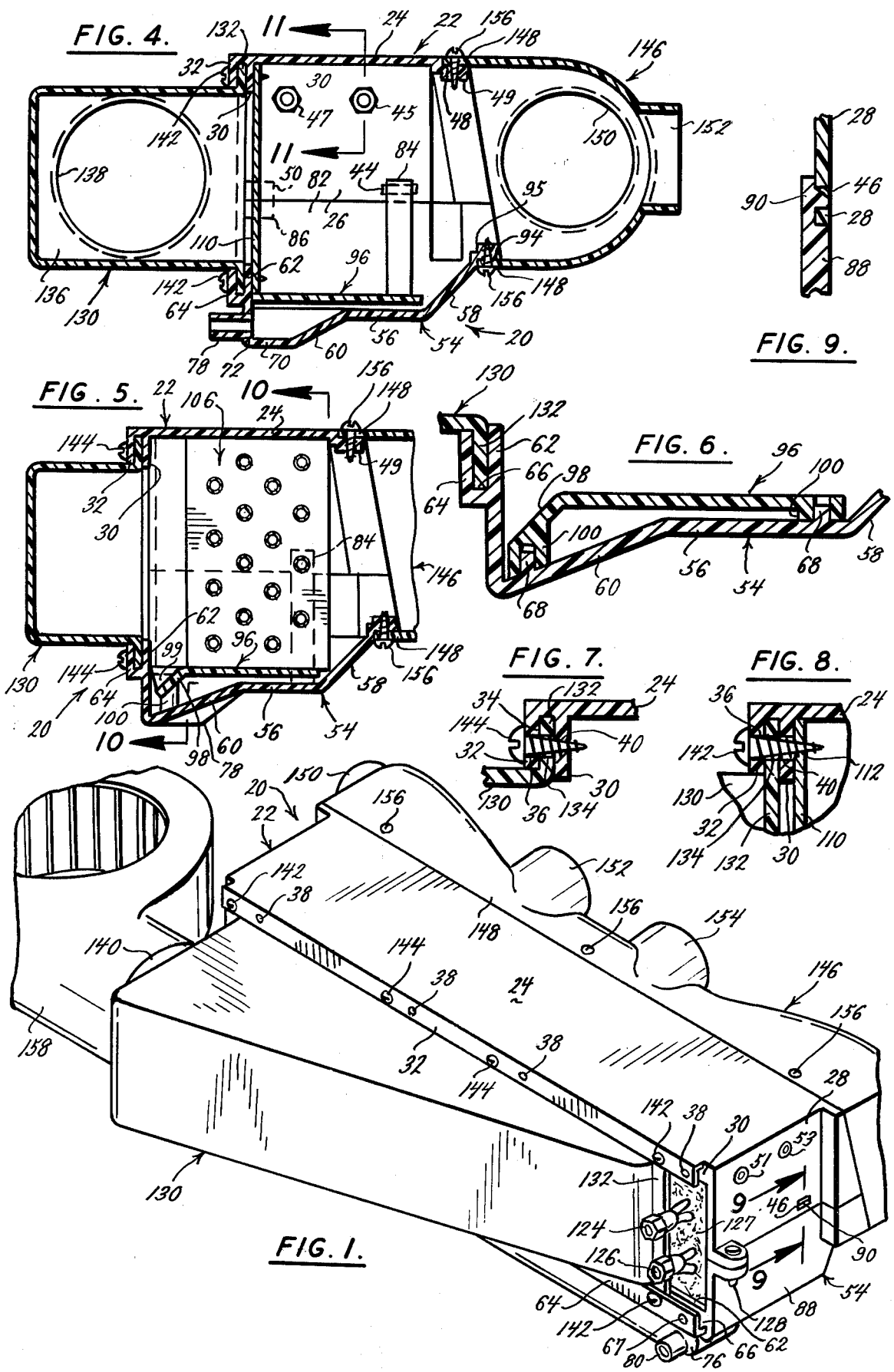

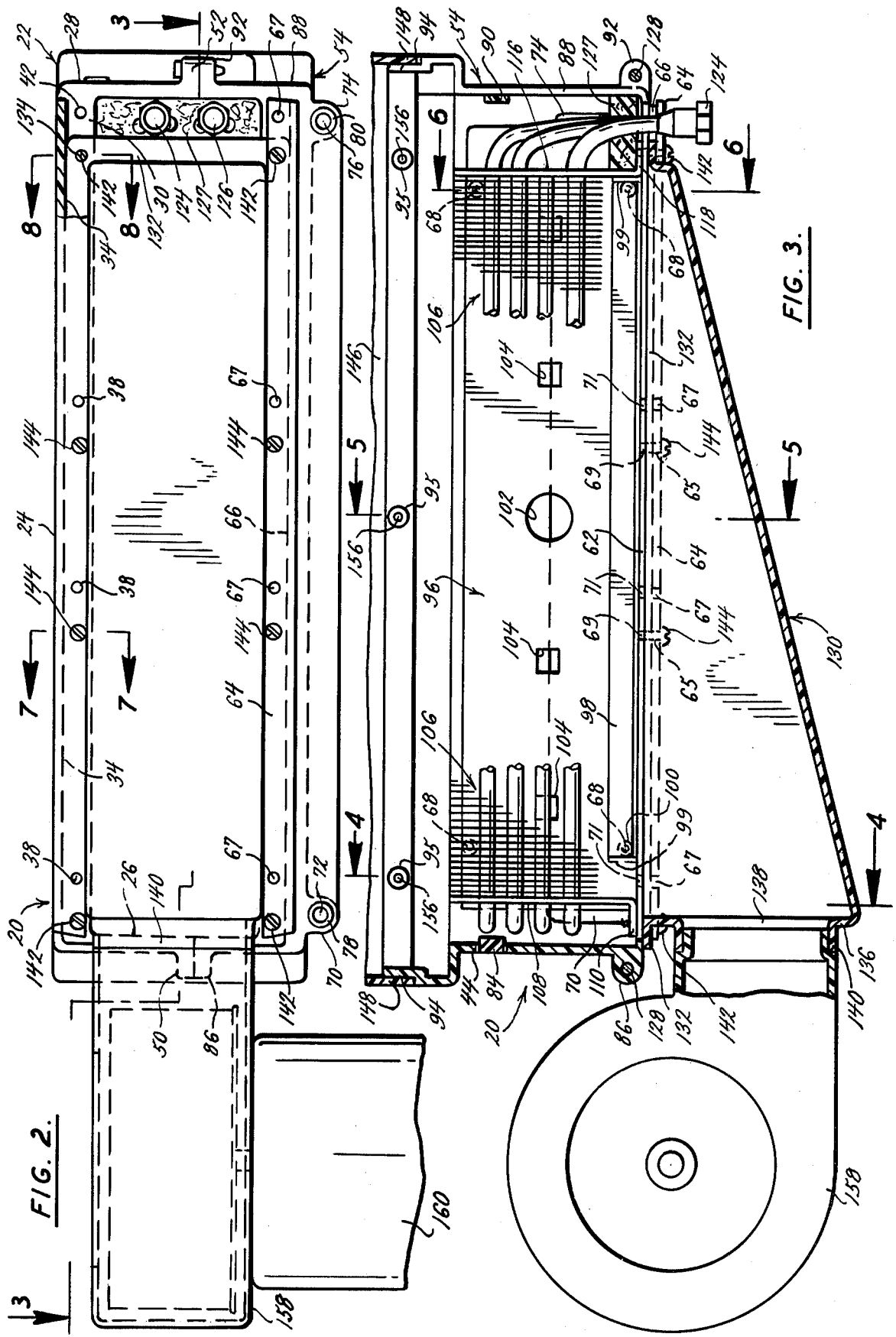

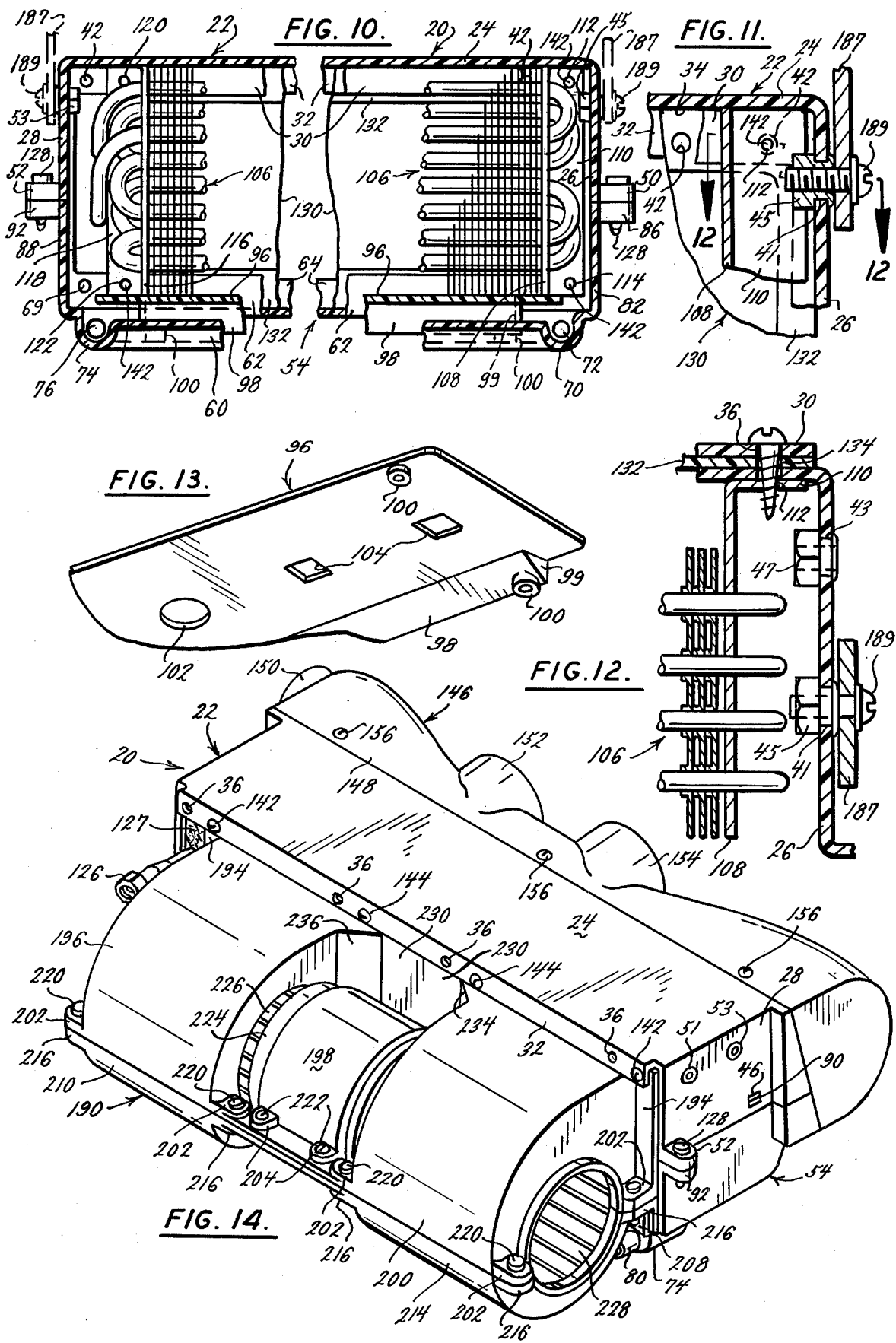

HOUSING FOR EXPANSION UNIT OF COOLING SYSTEM

BACKGROUND OF THE INVENTION

The expansion units of the cooling systems for vehicles customarily are mounted within molded housings. Those molded housings customarily are designed for use with a specific model of vehicle or with a few models of vehicles made by one manufacturer. However, no prior molded housing, for the expansion unit of a cooling system, was usable with various models of various vehicles made by various manufacturers.

SUMMARY OF THE INVENTION

The present invention provides a housing for the expansion unit of a cooling system; and the top wall, bottom wall and end walls of that housing define a space which accommodates that expansion unit. That housing has a rear opening which is substantially closed by an air-guiding member; and that air-guiding member is shorter than that opening to provide a short space which can accommodate the supply and return headers of the expansion unit. That air-guiding member can be set in either of two predetermined positions relative to that opening to permit the supply and return headers to be located at either end of the housing. As a result, the housing of the present invention can be used in a vehicle which requires the supply and return headers of the expansion unit to be adjacent one end of that housing, and also can be used in a vehicle which requires the supply and return headers of the expansion unit to be adjacent the opposite end of that housing. It is, therefore, an object of the present invention to provide a housing, for the expansion unit of a cooling system, which has an air-guiding member that permits the supply and return headers of that expansion unit to be located adjacent either end of that housing.

The air-guiding member provided by the present invention can support a motor and a pair of multi-vane blowers, or it can be an angular transition for a single blower. That air-guiding member can be set in upright position or in inverted position adjacent the opening in the rear of the housing; and hence that air-guiding member can be located in places where it might not be locatable if it could be set adjacent that opening in just one position. It is, therefore, an object of the present invention to provide an air-guiding member which can be set in upright position or in inverted position adjacent the opening in the rear of a housing for an expansion unit.

Two sets of fastener-receiving openings are provided in the housing of the present invention adjacent the rear opening; and a complementary set of fastener-receiving openings in the air-guiding member can be disposed in register with either of those sets of fastener-receiving openings. When the complementary set of fastener-receiving openings in the air-guiding member is disposed in register with either of the sets of fastener-receiving openings in the housing, that air-guiding member will block the other set of fastener-receiving openings. Such an arrangement facilitates quick and easy assembly of the air-guiding member with the housing in either of the two positions. It is, therefore, an object of the present invention to provide two sets of fastener-receiving openings adjacent the rear opening in a housing for the expansion unit of a cooling system, to provide a complementary set of fastener-receiving openings in an air-guiding member which can be disposed in register with either of those sets of fastener-receiving openings, and to enable that air-guiding member to block one set of those fastener-receiving openings whenever the complementary set of fastener-receiving openings thereof is in register with the other of those sets of fastener-receiving openings.

Supports are provided on the housing, adjacent the upper and lower edges of the rear opening in the housing for the expansion unit, to hold the complementary set of fastener-receiving openings of the air-guiding member in position adjacent either of the two sets of fastener-receiving openings in the housing, so a workman can use both hands to set fasteners that will hold the air-guiding member in assembled relation with the housing. Those supports hold that air-guiding member while permitting that air-guiding member to be shifted endwise relative to the housing, and hence endwise relative to the two sets of fastener-receiving openings. It is, therefore, an object of the present invention to provide supports adjacent the upper and lower edges of an opening in a housing for an expansion unit to support, while permitting endwise shifting of, an air-guiding member.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

BRIEF DESCRIPTION OF THE DRAWING

In the drawing,

FIG. 1 is a perspective view of one preferred embodiment of housing, for the expansion unit for a cooling system, which is made in accordance with the principles and teachings of the present invention, FIG. 2 is a partially broken away and sectioned rear view of that housing, FIG. 3 is a sectional view through the housing of FIGS. 1 and 2, and it is taken along the broken plane indicated by the broken line 3—3 in FIG. 2, FIG. 4 is another sectional view through the housing of FIGS. 1 and 2, and it is taken along the broken plane indicated by the broken line 4—4 in FIG. 3, FIG. 5 is yet another sectional view through the housing of FIGS. 1 and 2, and it is taken along the plane indicated by the line 5—5 in FIG. 3, FIG. 6 is a sectional view, on a larger scale, through the lower section of the housing of FIGS. 1 and 2, and it is taken along the plane indicated by the line 6—6 in FIG. 3, FIG. 7 is a sectional view, on the scale of FIG. 6, through part of the upper section of the housing of FIGS. 1 and 2, and it is taken along the plane indicated by the line 7—7 in FIG. 2, FIG. 8 is a sectional view, on the scale of FIG. 6, through another part of the upper section of the housing of FIGS. 1 and 2, and it is taken along the plane indicated by the line 8—8 in FIG. 2, FIG. 9 is a sectional view, on an even larger scale, through a mid-portion of one end wall of the housing of FIGS. 1 and 2, and it is taken along the plane indicated by the line 9—9 in FIG. 1, FIG. 10 is a sectional view through the housing of FIGS. 1 and 2, and it is taken along the broken plane indicated by the broken line 10—10 in FIG. 5, FIG. 11 is a large scale sectional view showing the structure in the upper right-hand portion of FIG. 10, and it is taken along the plane indicated by the line 11—11 in FIG. 4, FIG. 12 is a sectional view, on the scale of FIG. 11, through the structure in the upper right-hand portion of FIG. 10, and it is taken along the broken plane indicated by the broken line 12—12 in FIG. 11, FIG. 13 is a perspective view of a portion of the lower surface of a coil bottom plate used in the housing of FIGS. 1 and 2, FIG. 14 is a perspective view of the housing of FIGS. 1 and 2 as it appears when it has a plural-scroll air-guiding member secured to the rear surface thereof.

DETAILED DESCRIPTION OF THE PREFERRED EMBODIMENT

Figure 15:
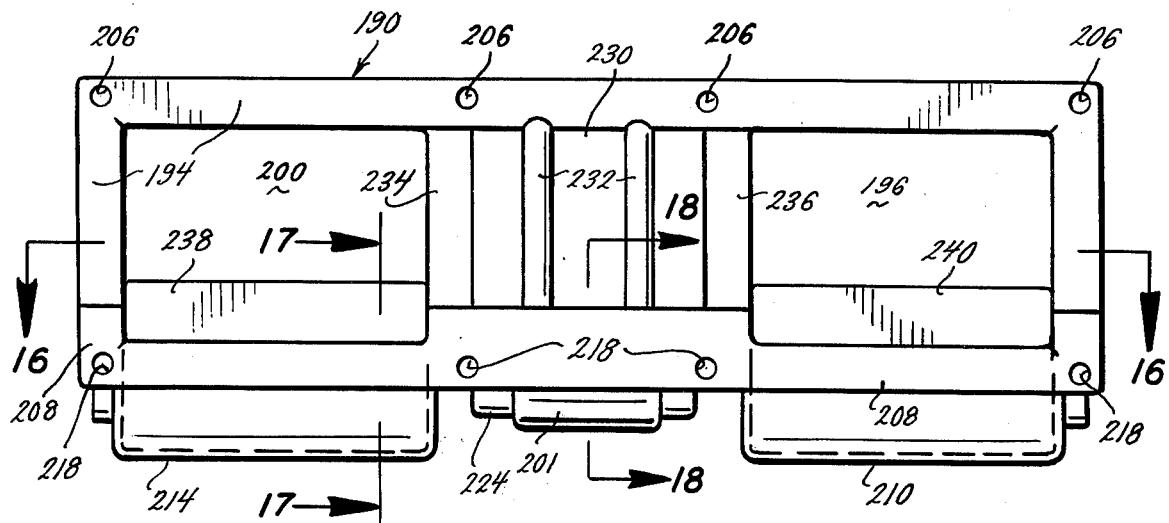
FIG. 15 is an elevational view of the front of the air-guiding member shown in FIG. 14.

Referring to the drawing in detail, the numeral 20 generally denotes a housing for the expansion unit 106 of the cooling system for a vehicle. That expansion unit is shown, and preferably will be made, as a finned coil with end turns. The housing 20 is shown, and preferably will be made, as two molded sections of high impact-resistant plastic material which are easily interfitted and assembled together. Specifically, that housing is shown as having a molded upper section 22 and a molded lower section 54. The upper section 22 has a top wall 24 and end walls 26 and 28. That top wall is essentially planar, as shown particularly by FIGS. 1, 4 and 5; and those end walls depend downwardly from that top wall at ninety degrees. A downwardly-depending flange 30 extends along the rear edge of the top wall 24; and a downwardly-depending flange 32 is in register with, but is spaced a short distance rearwardly of, the flange 30 to define an elongated groove 34.

Holes 36 are provided in the flange 32 at four spaced points along the length of that flange; and those holes have the same diameters. Holes 40 are provided in the flange 30 in register with the holes 36; and the endmost holes 40 have the same diameters as the holes 36 as indicated by FIG. 8, but the centermost holes 40 have smaller diameters, as indicated by FIG. 7. Holes 38 are provided in the flange 32 at four spaced points along the length of that flange; and those holes are spaced about thirteen-sixteenths of an inch to the right of the holes 36, as the housing 20 is viewed from the rear thereof. The diameters of the holes 38 are equal to the diameters of the holes 36. Holes 42 are provided in the flange 30 in register with the holes 38; and the endmost holes 42 have the same diameters as the holes 36 and 38, but the centermost holes 42 have smaller diameters.

The numeral 44 denotes a rectangular opening in the end wall 26; and that opening is adjacent the lower edge of that end wall. The numeral 46 denotes a rectangular opening in the end wall 28; and that opening is adjacent the lower edge of that end wall. The openings 44 and 46 are in register with each other.

The numeral 48 denotes a recess in the front edge of the top wall 24, of the end wall 26, and of the end wall 28. That recess will coact with a recess 94 in the front edge of the lower section 54 to form part of a rabbet joint. Bosses 49 are formed on the under surface of the top wall 24 adjacent the forward edge of that top wall. Openings extend through those bosses and through that top wall.

The numeral 50 denotes a boss which has a vertically-directed opening therein; and that boss extends outwardly from the outer surface of the end wall 26. The lower face of that boss is coplanar with the lower edges of the end walls 26 and 28. The numeral 52 denotes a second boss which has a vertically-directed opening therein; and that boss extends outwardly from the outer surface of the end wall 28. The lower face of that second boss is coplanar with the lower edges of the end walls 26 and 28.

The numeral 41 denotes a hole in the side wall 28 of the upper section 22; and the numeral 43 denotes a similar hole in the end wall. A flush, self-clinching nut 45 is mounted in the hole 41, and a similar nut 47 is mounted in the hole 43. Flush, self-clinching nuts 51 and 53 are mounted in corresponding holes in the end wall 26 of the upper section 22. If desired, the flush self-clinching nuts 45, 47, 51 and 53 could be replaced by nuts which were molded into the end walls 26 and 28 when the upper section 22 is molded.

The molded lower section 54 of the housing 20 has a planar central bottom portion 56, a planar upwardly-inclined front bottom portion 58, and a generally planar downwardly-inclined rear bottom portion 60. A vertical flange 62 extends upwardly from the rear edge of the rear bottom portion 60, as shown particularly by FIG. 6; and that flange extends along the length of that rear bottom portion. An upwardly-extending flange 64 is in register with, but is spaced a short distance rearwardly of, the flange 62 to define an elongated groove 66. That groove opens upwardly; and it will underlie and confront the downwardly-opening groove 34 in the upper section 22 whenever that section is assembled with the lower section 54.

Holes 65 are provided in the flange 64 at four spaced points along the length of that flange; and those holes have the same diameters and spacings as the holes 36 in the flange 32 on the upper section 22. Holes 69 are provided in the flange 62 in register with the holes 65; and the endmost holes 69 have the same diameters as the holes 36 and 65; but the centermost holes 69 have smaller diameters. Holes 67 are provided in the flange 64 at four spaced points along the length of that flange; and those holes have the same diameters and spacings as the holes 38. Holes 71 are provided in the flange 62 in register with the holes 67; and the endmost holes 71 have the same diameters as the holes 36 and 69, but the centermost holes 71 have smaller diameters.

The numeral 68 denotes two positioning pins which extend upwardly from the upper surface of the central bottom portion 56, and also denotes two further positioning pins which extend upwardly from the upper surface of the rear bottom portion 60, all as shown by FIG. 6. The positioning pins 68 are spaced inwardly short distances from the inner faces of the end walls 82 and 88 of the lower section 54.

The end wall 26 of the upper section 22 and the end wall 82 of the lower section 54 will be effectively coplanar when those sections are assembled together; and those end walls will coact to constitute one end wall for the housing 20. Similarly, the end wall 28 of the upper section 22 and the end wall 88 of the lower section 54 will be effectively coplanar when those sections are assembled together; and those end walls will coact to constitute the other end wall for the housing 20.

The numeral 70 denotes a drain sump which is formed as a part of the downwardly-inclined rear bottom portion 60; and that drain sump is close to the end wall 82. An outlet opening 72 in that drain sump has a tubular fitting 78 suitably secured therein, as by cement. The numeral 74 denotes a second drain sump which is formed as a part of the downwardly-inclined rear bottom portion 60; and that drain sump is close to the end wall 88. An outlet opening 76 in that drain sump has a tubular fitting 80 suitably secured therein, as by cement. The outer ends of the tubular fittings 78 and 80 will have the ends of drain hoses telescoped over them.

A flexible locking projection 84 extends upwardly above the upper edge of the end wall 82 of the lower section 54, as shown by FIGS. 4 and 5. The upper end of that flexible locking projection will be in register with, and will extend into, the opening 44 in the end wall 26 of the upper section 22 whenever the lower section 54 is assembled with that upper section. A flexible locking projection 90 extends upwardly above the upper edge of the end wall 88 of the lower section 54. The upper end of the flexible locking projection 90 will be in register with, and will extend into, the opening 46 in the end wall 28 of the upper section 22 whenever the lower section 54 is assembled with that upper section. The upper edges of the locking portions of the flexible locking projections 84 and 90 are inclined to the horizontal, as indicated by FIG. 9; and hence those locking portions will automatically be forced to move toward each other as the lower edges of the end walls 26 and 28 of the upper section 22 are pressed downwardly against those upper edges. However, as soon as the openings 44 and 46 are moved into register with the locking portions of the flexible locking projections 84 and 90, respectively, those locking portions will enter those openings. Thereafter, those flexible locking projections will help hold the upper and lower sections 22 and 54 in assembled relation.

Bosses 95 are formed on the upper surface of the upwardly-inclined front bottom wall portion 58 adjacent the forward edge of that front bottom wall portion. Openings extend through those bosses and through that front bottom wall portion.

The numeral 86 denotes a boss which has a vertically-directed opening therein; and that boss extends outwardly from the outer surface of the end wall 82 of the lower section 54 of the housing 20. The opening in that boss will underlie, and will be in register with, the opening in the boss 50 on the end wall 26 of the upper section 22 whenever the lower section 54 is assembled with that upper section. The upper face of the boss 86 is coplanar with the upper edges of the end walls 82 and 88 of that lower section. The numeral 92 denotes a boss which has a vertically-directed opening therein; and that boss extends outwardly from the outer surface of the end wall 88 of the lower section 54. The opening in that boss will underlie, and will be in register with, the opening in the boss 52 on the end wall 28 of the upper section 22 whenever the lower section 54 is assembled that with upper section. The upper face of the boss 92 is coplanar with the upper edges of the end walls 82 and 88 of that lower section.

The flush, self-clinching nut 45 or the flush, self-clinching nut 47 is intended to receive, and to be supported by, the inner end of a threaded stud or bolt 189 which will be held by a strut, brace, hanger or the like 187 of the vehicle in which the housing 20 will be mounted. Similarly, the flush, self-clinching nut 51 or the flush, self-clinching nut 53 is intended to receive, and to be supported by, the inner end of a further threaded stud or bolt 189 which will be held by a further strut, brace, hanger or the like 187 of the vehicle in which the housing 20 will be mounted. Tightening of those studs or bolts will fix the position of the housing 20 within the vehicle. If desired, two studs, braces, hangers or the like 187 could be mounted adjacent one end of the housing 20; and the ends of two threaded studs or bolts 189, which were held by those studs, braces, hangers or the like, could seat within the flush, self-clinching nuts in that end of that housing. Tightening of those studs or bolts would fix the position of the housing 20 within the vehicle.

The numeral 96 generally denotes a coil bottom plate which preferably is made from a high impact-resistant plastic material; and it is essentially planar, but it has a downwardly-inclined rear portion 98. Generally triangular portions 99 of that plate extend downwardly from the plane of that plate to the ends of the downwardly-inclined portion 98. Four, short cylindrical bosses 100 with openings therein are provided at the lower face of the coil bottom plate 96. The openings in two of those bosses will telescope downwardly over the two positioning pins 68 which extend upwardly from the central bottom portion 56 of the lower section 54; and the openings in the other two of those bosses will telescope downwardly over the two positioning pins 68 which extend upwardly from the downwardly-inclined rear bottom portion 60. Those bosses will space the lower surface of the coil bottom plate 96 about one-eighth of an inch above the central bottom portion 56 of the lower section 54 to enable condensate to collect therebetween. When the space between the lower surface of that coil bottom plate and the upper surface of that central bottom portion becomes filled with condensate, additional condensate will flow downwardly along the downwardly-inclined rear bottom portion 60 and enter the drain sumps 70 and 74. A circular opening 102 and square openings 104 are provided in the coil bottom plate 96 to permit condensate from the expansion unit 106 to pass downwardly into the space below that coil bottom plate. That circular opening is adjacent the midpoint of that coil bottom plate, and those square openings are spaced between that circular opening and the ends of that coil bottom plate.

The lower edge of the flange 30 on the upper section 22 of the housing 20 coacts with the upper edge of the flange 62 on the lower section 54 of that housing and with the rear edges of the end walls of those sections to define a large unobstructed opening at the rear of that housing. That opening is longer than one-half of the overall length of that housing, and it has a height which is greater than one-half of the overall height of that housing. The front edge of the top wall 24 of the upper section 22 and the front edge of the upwardly-inclined front body portion 58 of the lower section 54 coact with the inner faces of the forward edges of the end walls of those sections to define a large and unobstructed opening at the front of the housing 20.

The expansion unit 106 has an end wall 108 which has a portion thereof that extends rearwardly of the plane defined by the rear edges of the fins of that unit and which is bent outwardly at ninety degrees to form a flange 110 that is in register with the adjacent end turns of that expansion unit. Two openings 112 and 114 are provided in the flange 110; and the opening 112 can be disposed in register with that opening 36 in the flange 32 which is closest to the end wall 26 or can be disposed in register with that opening 67 in the flange 64 which is closest to the end wall 88. The opening 114 can be disposed in register with that opening 65 in the flange 64 which is closest to the end wall 82 or can be disposed in register with that opening 38 in the flange 32 which is closest to the end wall 28. The expansion unit 106 has a second end wall 116 which has a portion thereof that extends rearwardly of the plane defined by the rear edges of the fins of that unit and which is bent outwardly at ninety degrees to form a flange 118 that is in register with the adjacent end turns of that expansion unit. Two openings 120 and 122 are provided in the flange 118; and the opening 120 can be disposed in register with that opening 36 in the flange 32 which is closest to the end wall 28 or can be disposed in register with that opening 67 in the flange 64 which is closest to the end wall 82. The opening 122 can be disposed in register with that opening 65 in the flange 64 which is closest to the end wall 88 or can be disposed in register with that opening 38 in the flange 32 which is closest to the end wall 26.

The supply header 124 of the expansion unit 106 extends outwardly beyond and rearwardly of the flange 118; and the return header 126 also extends outwardly and rearwardly of that flange. Those headers will extend rearwardly of the flanges 32 and 64 on the housing 20; and they will be connected to suitable supply and return lines of a cooling system. An air stop 127 of standard and usual design will have openings therein fitted around the headers 124 and 126, as indicated by FIG. 1. That air stop will fill that part of the rear opening of the housing which is not closed by an air-guiding member 130 which is shown in FIG. 1.

The expansion unit 106 can be made as a finned coil which is four rows high and four rows deep, or as a finned coil which is four rows high and five rows deep. The housing 20 is large enough to accommodate the five row deep expansion unit; and hence can accommodate that expansion unit or a four row deep expansion unit. This means that the housing 20 can accommodate either of two sizes of expansion unit, and can accommodate each of those sizes of expansion unit in its upright or inverted position.

In assembling the housing 20, the tubular fittings 78 and 80 will be suitably secured within the drain outlets 72 and 76, respectively. The flush self-cleaning nuts 45, 47, 51 and 53 will be secured to the end walls 28 and 26, respectively. Thereafter, the coil bottom plate 96 will be positioned within the lower section 54 so the openings in the bosses 100 will telescope downwardly over the positioning pins 68 which extend upwardly from the central bottom portion 56 and from the downwardly-inclined rear bottom portion 60.

At this time, the expansion unit 106 will be set in position atop the coil bottom plate 96; and that expansion unit will have the supply and return headers 124 and 126 set adjacent the end walls 28 and 88, as shown by FIG. 1, or will have those supply and return headers set adjacent the end walls 26 and 82, as shown by FIG. 14. Those headers will be set adjacent that end wall of the housing 20 adjacent which they must be set to meet the specifications of the particular user of that housing. The expansion unit 106 will be moved rearwardly until the lower portions of the flanges 110 and 118 thereof abut, and are held against further rearward movement by, the inner face of the flange 62.

The upper section 22 will then be moved into position above the expansion unit 106; and it will have its end wall 26 aligned with the end wall 82 of the lower section 54, it will have its end wall 28 aligned with the end wall 88 of that lower section, and it will have its groove 34 aligned with the groove 66 of that lower section. At such time, downward movement of that upper section will cause the lower edges of the end walls 26 and 28 to engage the inclined upper edges of the locking portions of the flexible locking projections 84 and 90. Continued downward movement of that upper section will force the locking portions of those flexible locking projections to move toward each other until the openings 44 and 46 move into register with those locking portions. Thereupon, those locking portions will move into those openings to maintain the upper section 22 in assembled relation with the lower section 54. At such time a fastener 128, such as a self-tapping screw, will be passed downwardly through the opening in the boss 52 and seated in the opening in the boss 92. Also, a similar fastener will be passed downwardly through the opening in the boss 50 and seated in the opening in the boss 86. Those fasteners will coact with the locking portions of the flexible locking projections 84 and 90 to prevent shifting or accidental separation of the lower section 54 relative to the upper section 22.

The air-guiding member 130 preferably is molded from a high impact-resistant plastic material; and it has the form of an angular transition. That air-guiding member is generally triangular in plan view, as shown particularly by FIG. 1. A perimetral flange 132 is provided on that air-guiding member; and that flange has a set of holes 134 therein. An opening 138 is provided in the end wall 136 of that air-guiding member; and a collar 140 encircles that opening 138 and projects outwardly from that end wall.

The perimetral flange 132 is dimensioned to have the upper portion thereof extend into and be confined by the groove 34 in the upper section 22 of the housing 20; and it also is dimensioned to have the lower portion thereof extend into and be confined by the groove 66 in the lower section 54. When the air-guiding member 130 is to be assembled with the housing 20, the end wall 136 thereof will be displaced from the end walls 26 and 82, the other end thereof will be set close to those end walls, and the upper and lower portions of the flange 132 will be aligned with the grooves 34 and 36. Thereafter, that air-guiding member can be telescoped into the position shown by FIG. 1; and, in that position, the flanges 32 and 64 will hold that air-guiding member against movement rearwardly of the housing 20. Also, those flanges will hold the openings 134 in effective registry with the holes 36 and 65. Consequently, the flanges 32 and 64 act as supporting members for the air-guiding member 130, and also facilitate the securing of fasteners 142 and 144 to the housing 20.

It should be noted that the upper portion and the lower portion of the perimetral flange 132 are formed so they can abut the rear faces of the flanges 30 and 62 in such intimate engagement that no gasket or seal is required to effectively prevent the escape of air. Similarly, that end portion, of the perimetral flange 132, which is adjacent the end wall 136 of that air-guiding member is made so it can engage the rear face of either end wall of the housing 20 in such intimate engagement that no gasket or seal is needed to prevent the escape of air.

The openings 134 in the upper portion of the flange 132 of air-guiding member 130 can be set in register with the openings 36 in the flange 32 or, when that air-guiding member is inverted, can be set in register with the openings 67 in the flange 64. The openings 134 in the bottom portion of the flange 132 can be set in register with the openings 65 in the flange 64, or when the air-guiding member 130 is inverted, can be set in register with the openings 38 in the flange 32. This means that the air-guiding member 130 can be securely fixed in the position shown by FIG. 1, wherein it effectively closes all but a short right-hand portion of the opening in the rear of the housing 20, or can be inverted and securely fixed in a position wherein it effectively closes all but a short left-hand portion of that opening.

Two fasteners 142, which preferably are fine thread self-tapping metal screws, extend through the endmost openings 36 in the flange 32, through the endmost openings 134 in the upper portion of the flange 132 of the air-guiding member 130, through the endmost openings 40 in the flange 30, and seat in the openings 112 and 120 in the flanges 110 and 118 of the expansion unit 106. Those fasteners will clamp the upper ends of the flanges 110 and 118 against the inner face of the flange 30; and hence the latter flange will serve as a stop for that expansion unit. Those fasteners also will clamp the flanges 32 and 132 solidly in position relative to the flange 30. Two additional fasteners 142 extend through the endmost opening 65 in the flange 64, through the endmost openings 134 in the bottom portion of the flange 132 on the air-guiding member, through the endmost openings 69 in the flange 62, and seat in the openings 114 and 122 in the flanges 110 and 118. Those two fasteners will clamp the lower portions of the flanges 110 and 118 against the inner face of the flange 62, and also will clamp the flanges 64 and 132 solidly in position relative to the flange 62.

Two fasteners 144, which preferably are relatively-coarse thread self-taping screws, extend through the centermost openings 36 in the flange 32, through the centermost openings 134 in the upper portion of the flange 132 of the air-guiding member 130, and seat in the centermost openings 40 of the flange 30. Also, two additional fasteners 144 extend through the centermost openings 65 in the flange 64, through the centermost openings 135 in the bottom portion of the flange 130 of the air-guiding member 130, and seat in the centermost openings 69 of the flange 62. The fasteners 142 and 144 will effectively hold the front face of the uppermost portion, of the lowermost portion, and of one end portion of the flange 132 in air-blocking engagement with the flange 30, with the flange 62, and with one of the end walls of the housing 20.

The numeral 146 generally denotes a transition member which is securable to the front of the housing 20. That transition member is one of a number of specifically-different transition members which are usable in different makes and models of vehicles. That transition member has a perimetral flange 148 which is dimensioned to engage and telescope over the perimetral recess which is located at the front of the housing 20 and which is constituted by the contiguous recesses 48 and 94 on the upper and lower sections 28 and 54, respectively. That flange will coact with that perimetral recess to define a rabbet joint. Fasteners 156, which preferably are self-tapping screws, extend inwardly through openings in the flange 148 to seat in the openings within the bosses 49 and 95, respectively, on the under surface of the top wall 24 and on the upper surface of the upwardly-inclined forward bottom portion 58. Those fasteners will prevent accidental separation of the transition member 146 from the housing 20.

The numeral 150 denotes an air outlet in one end of the transition member 146, and the numerals 152 and 154 denote further air outlets in the front of that transition member. Those air outlets will be connected by suitable conduits to air-distributing members of the vehicle in which the housing 20 is mounted. The group of transition members, of which the transition member 146 is one, can vary widely in configuration, numbers of air outlet openings, and placement of air outlet openings. Importantly, all of those transition members will have a flange which is effectively identical to the flange 148, and also will have openings which can accommodate the fasteners 156. As a result, the housing 20 can be used with many individually-different front transition members.

The numeral 158 denotes a blower which has an air outlet that can be connected directly, or indirectly, to the collar 140 on the end wall 136 of the air-guiding member 130. A motor 160 is secured to, and provides the motive power for, the rotor of that blower.

In those instances where space limitations within a vehicle require the blower 158 to be disposed closer to the end walls 26 and 82 than to the end walls 28 and 88, the air-guiding member 130 will be secured to the housing 20 in the position shown by FIG. 1. However, where those space limitations require the blower 158 to be disposed closer to the end walls 28 and 88 than to the end walls 26 and 82, the air-guiding member 130 will be secured to the housing 20 in a position where the end wall 136 thereof is close to the end walls 28 and 88 and wherein the opposite end of the perimetral flange 132 is spaced a short distance from the end walls 26 and 82. In the latter event, the expansion unit 106 will be installed in the housing 20 so the headers 124 and 126 thereof are adjacent the end walls 26 and 82.

Referring particularly to FIGS. 14-18, the numeral 190 generally denotes a second embodiment of air-guiding member which can be used with the housing 20 of FIGS. 1 and 2. That air-guiding member preferably is molded from a high impact-resistant plastic material; and it preferably is molded so it has an upper section and a lower section. The upper section has a flange 194 which defines the upper edge and the end edges of that upper section, has a half-scroll 196 for a multi-vane blower 226, has a half-support 198 for a motor 224, and has a half-scroll 200 for a multi-vane blower 228. Bosses 202 with vertically-directed openings therein are provided at each end of the half-scroll 196, and further bosses 202 are provided at each end of the half-scroll 200. Smaller bosses 204 with vertically-directed openings therein are provided at the ends of the half-support 198.

The lower section of the air-guiding member 190 has a flange 208 which defines the bottom edge and the end edges of that section. That lower section has a half-scroll 210 which is similar to, and which is intended to be set in register with, the half-scroll 196, has a half-support 201, which is similar to, and which is intended to be set in register with, the half-support 198, and has a half-scroll 214 which is similar to, and which is intended to be set in register with, the half-scroll 200. Bosses 216 with vertically-directed openings therein are provided in the lower section; and those bosses are similar to, and will be set in register with, the bosses 202. Two bosses, not shown, on the lower section are similar to, and will be set in register with, the two bosses 204. In addition, two openings are provided in the lower section which are in register with openings 199 that are adjacent the half-support 198 and that are shown in FIG. 16.

Figure 16:
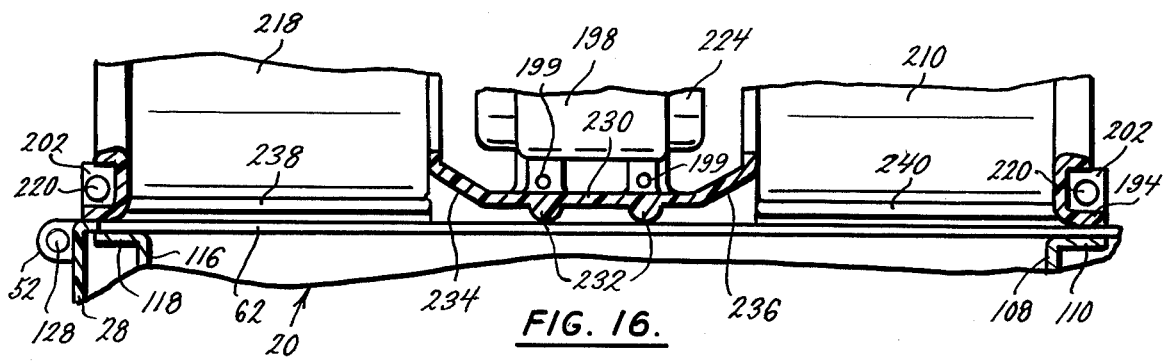
FIG. 16 is a sectional view through the air-guiding member shown in FIG. 14, and it is taken along the plane indicated by the line 16—16 in FIG. 15.
Figure 17:
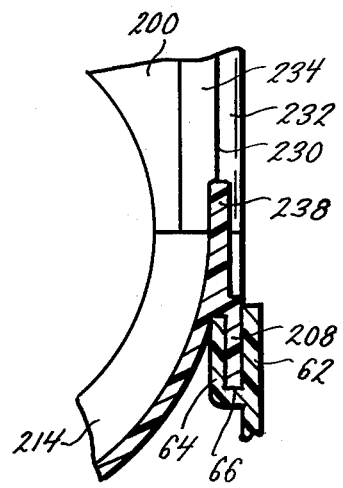
FIG. 17 is a sectional view, on a larger scale, through the air-guiding member of FIG. 14, and it is taken along the plane indicated by the line 17—17 in FIG. 15.
Figure 18:
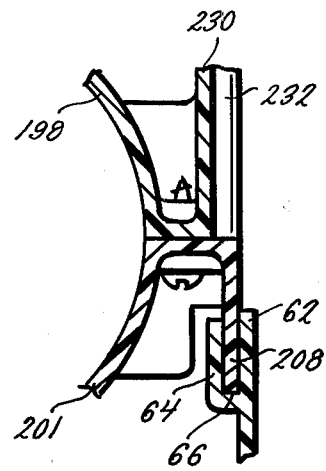
FIG. 18 is another sectional view on the scale of FIG. 17, through the air-guiding member of FIG. 14, and it is taken along the plane indicated by the line 18—18 in FIG. 15.

As shown particularly by FIGS. 15 and 16, the air-guiding member 190 has a partition 230 which is intermediate the scroll that is defined by the half-scrolls 196 and 210 and the scroll that is defined by the half-scrolls 200 and 214. Shallow ribs 232 of arcuate cross section are provided at the inner face of the partition 230, and those ribs extend upwardly from the flange 208 of the lower section to the flange 194 of the upper section of the air-guiding member 190. Surfaces 234 and 236, at those edges of the partition 230 which are adjacent the two scrolls, incline rearwardly from, and relieve, the plane which is defined by the flanges 194 and 208, as indicated by FIGS. 14 and 16. Those inclined surfaces permit air, which is moved forwardly by the multivane blowers 226 and 228, to move past those surfaces and toward the center of the partition 230 — and hence toward the longitudinal center of the housing 20. The numerals 238 and 240 denotes inward extensions of the flange 194 which are spaced forwardly of the rear-most portions of the surfaces 234 and 236, as shown particularly by FIG. 16. Those inward extensions serve as baffles which help cause air to move along the surfaces 234 and 236 and toward the center of the partition 230. As a result, the inclined surfaces 234 and 236 and the extensions 238 and 240 help distribute the air from the multi-vane blowers 226 and 228 across the entire rear surface of the expansion unit 106.

The motor 224 has a shaft which extends outwardly from each end of the stator thereof; and it supports and rotates the multi-vane blowers 226 and 228. A frictional material, not shown, will be interposed between the outer surface of the motor 224 and the inner surfaces of the half-support 198 and of the half-support, not shown. Fasteners 220 extend downwardly through the openings in the bosses 202 and set in the openings in the bosses 216. Fasteners 222 extend downwardly through the openings in the bosses 204 and seat in the openings in the bosses, not shown, which are in register with those bosses. Further fasteners extend downwardly through the openings 199 and seat in the openings in the lower section that are in register with those openings.

The flange 194 on the upper section of the air-guiding member 190 has a set of holes 206 therein which is comparable to, and has the same size and spacing as, the set of holes 134 in the upper portion of the flange 132 of the air-guiding member 130. The holes 206 can be set in register with the holes 36 or 38 in the flange 32, or can be set in register with the holes 65 or 67 in the flange 64. The flange 208 on the lower section of that air-guiding member has a set of holes 218 therein which is comparable to, and has the same size and spacing as, the set of holes 134 in the lower portion of the flange 132 of the air-guiding member 130. The holes 218 can be set in register with the holes 36 or 38 in the flange 32, or can be set in register with the holes 65 or 67 in the flange 64.

All of this means that the air-guiding member 190 can be set adjacent the rear openings of the housing 20 in either of two upright positions or in either of two inverted positions. All of this means that it is easier to mount the housing 20 and the air-guiding member 190 so they "clear" adjacent objects within a vehicle than it is to mount any prior housing and its air-guiding member.

When the air-guiding member 190 is assembled with the housing 20 so it is closer to the end walls 28 and 88 than it is to the end walls 26, and 82, all as shown by FIG. 14, the air stop 127 will be disposed intermediate the right-hand ends of the flanges 194 and 208 and the end walls 26 and 82. That air stop will close the gap between that air-guiding member and the latter end walls. When the air-guiding member 190 is assembled with the housing 20 so it is closer to the end walls 26 and 82 than it is to the end walls 28 and 88, the air stop 127 will be disposed intermediate the right-hand ends of the flanges 194 and 208 and the end walls 28 and 88. That air stop will close the gap between that air-guiding member and the latter end walls.

In assembling the air-guiding member 190 with the housing 20 in the manner indicated by FIG. 14, that air-guiding member will be displaced to one side of that housing and will be disposed so it has the flange 194 thereof aligned with the groove 30 in that housing and will have the flange 208 thereof aligned with the groove 66 in that housing. Thereafter, that air-guiding member will be moved so the upper edge of the flange 194 telescopes into the groove 30, and so the lower edge of the flange 208 telescopes into the groove 66. The air-guiding member 190 then will be moved into the position shown by FIG. 14; and, at such time, the openings 206 and 218 in the flanges 194 and 208 thereof will be in register, respectively, with the openings 38 and 67 in the flanges 32 and 64. The grooves 30 and 66 of the housing 20 will prevent accidental movement of that air-guiding member away from that housing, and also will hold the holes 206 and 218 in register, respectively, with the holes 38 and 67. Consequently, those grooves serve as supporting members which can facilitate the insertion of the fasteners 142 and 144 — by holding that air-guiding member in position adjacent the housing 20 and permitting the installer to use both hands to insert and drive those fasteners.

The grooves 34 and 66 at the upper and lower edges of the opening in the rear of the housing 20 are shown as being, and preferably will be, formed by the elongated, continuous flanges 32 and 64 on that housing. However, if desired, equivalents of those grooves could be provided by longitudinally-spaced L-shaped elements or by other members.

Whereas the drawing and accompanying description have shown and described a preferred embodiment of the present invention, it should be apparent to those skilled in the art that various changes may be made in the form of the invention without affecting the scope thereof.

What we claim is:

1. A housing, for an expansion unit of a cooling system, which has a bottom wall, a top wall, and end walls, said walls coacting to define a space within said housing which is dimensioned to accommodate said expansion unit, and an air-guiding member at one side of said housing, said air-guiding member having a partition thereon intermediate two scrolls for multi-vane blowers, said partition having those edges thereof which are adjacent said scrolls relieved to enable air, which exits from said scrolls, to move toward the longitudinal center of said partition as it passes from said air-guiding member into said space within said housing.

2. A housing as claimed in claim 1 wherein baffles adjacent said relieved edges of said partition help foster the movement of air past said edges and toward said center of said partition.

3. A housing, for an expansion unit of a cooling system, which has a bottom wall, a top wall, and end walls, said walls coacting to define a space within said housing which is dimensioned to accommodate said expansion unit, said housing having an opening at one side thereof, a supporting member adjacent the lower edge of said opening, and an air-guiding member that is disposable in engagement with said supporting member to receive support from said supporting member when said air-guiding member is disposed adjacent said one side of said housing to substantially close said opening, said supporting member helping provide a desired orientation of said air-guiding member with said opening and also facilitating the securement of said air-guiding member to said housing.

4. A housing as claimed in claim 13 wherein a second supporting member is adjacent the upper edge of said opening, wherein said air-guiding member is disposable in engagement with and receives support from said second supporting member when said air-guiding member is disposed adjacent said one side of said housing to substantially close said opening, and wherein said second supporting member also facilitates said securement of said air-guiding member to said housing.

5. A housing as claimed in claim 13 wherein said supporting member defines a groove that extends generally parallel to said lower edge of said opening to provide support for said air-guiding member at points along the length of said air-guiding member.

6. A housing as claimed in claim 3 wherein said housing has a plurality of fastener-receiving openings therein and has a second plurality of fastener-receiving openings therein, wherein said air-guiding member has a further plurality of fastener-receiving openings therein that are disposable in register with the first said or said second plurality of fastener-receiving openings, and wherein said supporting member facilitates the disposition of said further plurality of fastener-receiving openings in register with said first said or said second plurality of fastener-receiving openings.

7. A housing as claimed in claim 3 wherein a second supporting member is adjacent the upper edge of said opening, wherein said air-guiding member is disposable in engagement with and receives support from said second supporting member when said air-guiding member is disposed adjacent said one side of said housing to substantially close said opening, wherein said second supporting member also facilitates said securement of said air-guiding member to said housing, wherein the first said supporting member defines a groove that extends generally parallel to said lower edge of said opening to provide support for said air-guiding member at points along the length of said air-guiding member, and wherein said second supporting member defines a groove that extends generally parallel to said upper edge of said opening to provide support for said air-guiding member at points along the length of said air-guiding member.

8. A housing as claimed in claim 3 wherein a second supporting member is adjacent the upper edge of said opening, wherein said air-guiding member is disposable in engagement with and receives support from said second supporting member when said air-guiding member is disposed adjacent said one side of said housing to substantially close said opening, wherein said second supporting member also facilitates said securement of said air-guiding member to said housing, wherein the first said supporting member defines a groove that extends generally parallel to said lower edge of said opening to provide support for said air-guiding member at points along the length of said air-guiding member, wherein said second supporting member defines a groove that extends generally parallel to said upper edges of said opening to provide support for said air-guiding member at points along the length of said air-guiding member, and wherein said first said supporting member and said second supporting member permit endwise movement of said air-guiding member while holding said air-guiding member adjacent said one side of said housing.

9. A housing as claimed in claim 3 wherein a second supporting member is adjacent the upper edge of said opening, wherein said air-guiding member is disposable in engagement with and receives support from said second supporting member when said air-guiding member is disposed adjacent said one side of said housing to substantially close said opening, wherein said second supporting member also facilitates said securement of said air-guiding member to said housing, wherein the first said supporting member and said second supporting member confront each other, wherein said first said supporting member accommodates the top edge of said air-guiding member, and wherein said second supporting member accommodates the lower edge of said air-guiding member.

10. A housing as claimed in claim 3 wherein said air-guiding member is one of a plurality of individually-different air-guiding members, and wherein each of said individually-different air-guiding members has a surface therein which is engageable and supportable by said supporting member, said surfaces of all of said individually-different air-guiding members being substantially identical.

11. A housing as claimed in claim 3 wherein a second supporting member is adjacent the upper edge of said opening, wherein the upper edge of said air-guiding member is disposable in engagement with and receives support from the first said supporting member when said air-guiding member is disposed adjacent said one side of said housing, wherein the lower edge of said air-guiding member is disposable in engagement with and receives support from said second supporting member when said air-guiding member is disposed adjacent said one side of said housing to substantially close said opening.

12. A housing as claimed in claim 3 wherein said supporting member permits endwise shifting of said air-guiding member relative to said opening while helping support said air-guiding member.

13. A housing as claimed in claim 3 wherein a second supporting member is adjacent the upper edge of said opening, wherein said air-guiding member is disposable in engagement with and receives support from said second supporting member when said air-guiding member is disposed adjacent said one side of said housing to substantially close said opening, wherein said second supporting member also facilitates said securement of said air-guiding member to said housing, and wherein the first said and said second supporting members permit endwise shifting of said air-guiding member relative to said opening while supporting said air-guiding member.

14. A housing, for an expansion unit of a cooling system, which has a bottom wall, a top wall, and end walls, said walls coacting to define a space within said housing which is dimensioned to accommodate said expansion unit, said housing having an opening at one side thereof, a transition member which is disposed adjacent said one side of said housing to fill said opening, said transition member being adapted to receive air from said expansion unit and to distribute said air, said housing having a surface at said one side thereof which extends around and helps define said opening, said transition member being one of a plurality of individually-different transition members, each of said individually-different transition members having a complementary surface thereon which is engageable with said surface at said one side of said housing to enable said transition member to fill said opening.

15. A housing, for an expansion unit of a cooling system, which has a bottom wall, a top wall, and end walls, said walls coacting to define a space within said housing which is dimensioned to accommodate said expansion unit, said housing having an opening at one side thereof, and an air-guiding member that is disposed adjacent said one side of said housing, said housing having a surface at said one side thereof which extends around and helps define said opening, said air-guiding member having a surface thereon which is complementary to said surface at said one side of said housing and which is engageable with said surface at said one side of said housing to enable said air-guiding member to substantially close said opening, said housing having a first set of fastener-receiving openings therein, said housing having a second set of fastener-receiving openings therein, and said air-guiding member having a set of fastener-receiving openings therein which can be set in register with said first set or said second set of fastener-receiving openings in said housing, said surface of said air-guiding member blocking said first set of fastener-receiving openings in said housing whenever said set of fastener-receiving openings in said air-guiding member is set in register with said second set of fastener-receiving openings in said housing, said surface of said air-guiding member blocking said second set of fastener-receiving openings in said housing whenever said set of fastener-receiving openings in said air-guiding member is set in register with said first set of fastener-receiving openings in said housing.

16. A housing, for an expansion unit of a cooling system, which has a bottom wall, a top wall, and end walls, said walls coacting to define a space within said housing which is dimensioned to accommodate said expansion unit, said housing having an opening at one side thereof, and an air-guiding member that is disposed adjacent said one side of said housing, said housing having a surface at said one side thereof which extends around and helps define said opening, said air-guiding member having a surface thereon which is complementary to said surface at said one side of said housing and which is engageable with said surface at said one side of said housing to enable said air-guiding member to substantially close said opening, the engagement between said surfaces being intimate and minimizing escape of air therebetween, thereby obviating the need of a seal or gasket between said surfaces, said air-guiding member being one of a plurality of individually-different air-guiding members.

17. A housing, for an expansion unit of a cooling system, which has a bottom wall, a top wall, and end walls, said walls coacting to define a space within said housing which is dimensioned to accommodate said expansion unit, said housing having an opening at one side thereof, and an air-guiding member that is disposed adjacent said one side of said housing, said housing having a surface at said one side thereof which extends around and helps define said opening, said air-guiding member having a surface thereon which is complementary to said surface at said one side of said housing and which is engageable with said surface at said one side of said housing to enable said air-guiding member to substantially close said opening, the length of said opening being greater than one half of the overall length of said housing, and the height of said opening being greater than one half of the overall height of said housing said air-guiding member being one of a plurality of individually-different air-guiding members.

18. A housing, for an expansion unit of a cooling system, which has a bottom wall, a top wall, and end walls, said walls coacting to define a space within said housing which is dimensioned to accommodate said expansion unit, said housing having an opening at one side thereof, and an air-guiding member that is disposed adjacent said one side of said housing, said housing having a surface at said one side thereof which extends around and helps define said opening, said air-guiding member having a surface thereon which is complementary to said surface at said one side of said housing and which is engageable with said surface at said one side of said housing to enable said air-guiding member to substantially close said opening, said air-guiding member being disposable adjacent said one side of said housing to substantially close said opening whether said air-guiding member is in an upright position or an inverted position.

19. A housing, for an expansion unit of a cooling system, which has a bottom wall, a top wall, and end walls, said walls coacting to define a space within said housing which is dimensioned to accommodate said expansion unit, said housing having an opening at one side thereof, and an air-guiding member that is disposed adjacent said one side of said housing, said housing having a surface at said one side thereof which extends around and helps define said opening, said air-guiding member being one of a plurality of individually-different air-guiding members, each of said individually-different air-guiding members having a surface thereon which is engageable with, and complementary to, said surface at said one side of said housing to enable said air-guiding member to substantially close said opening, said surfaces of all of said individually-different air-guiding members being substantially identical.

20. A housing as claimed in claim 19 wherein the engagement of said surfaces is intimate and minimizes escape of air therebetween, thereby obviating the need of a seal or gasket between said surfaces.

21. A housing, for an expansion unit of a cooling system, which has a bottom wall, a top wall, and end walls, said walls coacting to define a space within said housing which is dimensioned to accommodate said expansion unit, said housing having an opening at one side thereof, and an air-guiding member that is disposed adjacent said one side of said housing to substantially close said opening, said space within said housing accommodating said expansion unit and said opening accommodating the supply and return headers of said expansion unit whether said expansion unit is disposed within said space with said supply and return headers thereof adjacent one of said end walls or is disposed within said space with said supply and return headers thereof adjacent the other of said end walls, said air-guiding member being secured to said housing in one predetermined position adjacent said one side of said housing to substantially close said opening when said expansion unit is disposed within said space with said supply and return headers thereof adjacent said one end wall, and said air-guiding member being secured to said housing in a second and endwise-displaced predetermined position adjacent said one side of said housing to substantially close said opening when said expansion unit is disposed within said space with said supply and return headers thereof adjacent said other end wall.

22. A housing as claimed in claim 1 wherein said air-guiding member has a surface thereon that abuts a complementary surface at said one side of said housing, and wherein the engagement of said surfaces is intimate and minimizes escape of air therebetween, thereby obviating the need of a seal or gasket between said surfaces.

23. A housing as claimed in claim 1 wherein said air-guiding member has a surface thereon that abuts a complementary surface at said one side of said housing, wherein said complementary surface is comprised at least in part by the outer faces of flanges that help define two edges of said opening, and wherein the inner faces of said flanges serve as stops for said expansion unit.

24. A housing as claimed in claim 1 wherein the length of said opening is greater than one half of the overall length of said housing, and wherein the height of said opening is greater than one half of the overall height of said housing.

25. A housing as claimed in claim 1 wherein said air-guiding member is one of a plurality of individually-different air-guiding members.

26. A housing as claimed in claim 1 wherein said air-guiding member can be disposed adjacent said one side of said housing to substantially close said opening whether said air-guiding member is in an upright position or an inverted position.

27. A housing as claimed in claim 1 wherein said housing has a first set of fastener-receiving openings therein, wherein said housing has a second set of fastener-receiving openings therein, wherein said air-guiding member has a set of fastener-receiving openings therein which can be set in register with said first set or said second set of fastener-receiving openings in said housing, wherein said set of fastener-receiving openings in said air-guiding member is disposable in register with said first set of fastener-receiving openings in said housing whenever said air-guiding member is secured to said housing in said one predetermined position adjacent said one side of said housing, and wherein said set of fastener-receiving openings in said air-guiding member is disposable in register with said second set of fastener-receiving openings in said housing whenever said air-guiding member is secured to said housing in said second and endwise-displaced predetermined position adjacent said one side of said housing.

28. A housing as claimed in claim 1 wherein said housing has a surface at said one side thereof which extends around and helps define said opening, wherein said air-guiding member has a surface thereon which is engageable with said surface at said one end of said housing to enable said air-guiding member to substantially close said opening, wherein said surface on said housing has a first set of fastener-receiving openings therein, wherein said surface on said housing has a second and endwise-displaced set of openings therein, wherein said surface of said air-guiding member has a set of fastener-receiving openings therein, wherein said set of fastener-receiving openings in said air-guiding member is disposable in register with said first set of fastener-receiving openings in said housing whenever said air-guiding member is secured to said housing in said one predetermined position adjacent said one side of said housing, wherein said set of fastener-receiving openings in said air-guiding member is disposable in register with said second and endwise-displaced set of fastener-receiving openings in said housing whenever said air-guiding member is secured to said housing in said second and endwise-displaced predetermined position adjacent said one side of said housing, wherein said surface of said air-guiding member blocks said second and endwise-displaced set of fastener-receiving openings in said housing whenever said air-guiding member is secured to said housing in said one predetermined position adjacent said one side of said housing, and wherein said surface of said air-guiding member blocks said first set of fastener-receiving openings in said housing whenever said air-guiding member is secured to said housing in said second and endwise-displaced predetermined position adjacent said one side of said housing.

* * * * *

UNITED STATES PATENT OFFICE
CERTIFICATE OF CORRECTION

Patent No. 4,082,142                    Dated April 4, 1978

Inventor(s) Blackburn, James R. et al.

It is certified that error appears in the above-identified patent and that said Letters Patent are hereby corrected as shown below:

"13" in line 1 of claim 4 (Col.13, L.24) should be -3-
"13" in line 1 of claim 5 (Col.13, L.33) should be -3-

"1" in line 1 of claim 22 (Col. 17, L. 19) should be -21-
"1" in line 1 of claim 23 (Col. 17, L. 25) should be -21-
"1" in line 1 of claim 24 (Col. 17, L. 32) should be -21-
"1" in line 1 of claim 25 (Col. 17, L. 37) should be -21-
"1" in line 1 of claim 26 (Col. 17, L. 40) should be -21-
"1" in line 1 of claim 27 (Col. 17, L. 45) should be -21-
"1" in line 1 of claim 28 (Col. 18, L. 15) should be -21-

Signed and Sealed this

Twenty-fourth Day of July 1979

[SEAL]

Attest:

LUTRELLE F. PARKER
*Attesting Officer*   *Acting Commissioner of Patents and Trademarks*